Dec. 6, 1949 W. G. CHAUSSE 2,490,028
HEATED TANK CONSTRUCTION FOR TANK VEHICLES
Filed Aug. 26, 1944 3 Sheets-Sheet 3
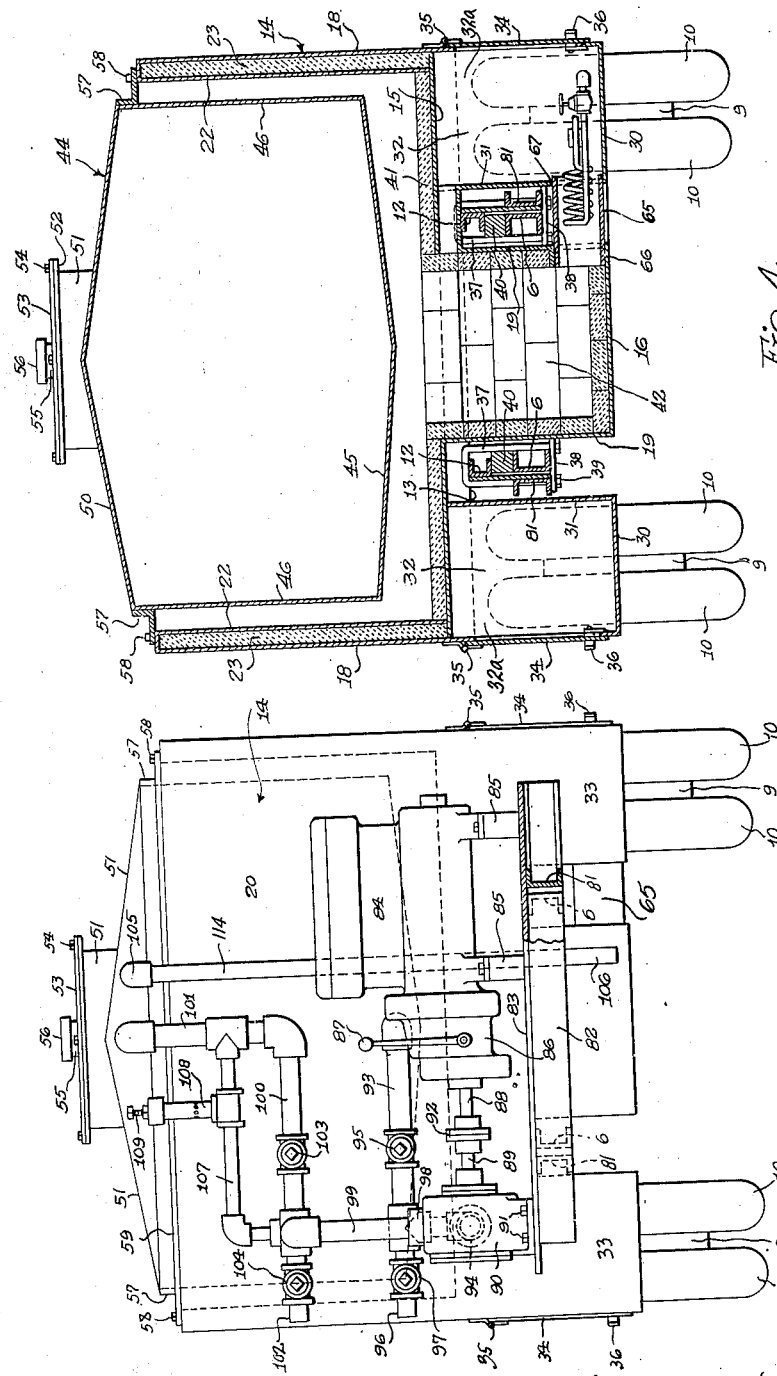
Inventor
Wilfred G. Chausse
By
Barthel & Bugbee
Attorneys Patented Dec. 6, 1949

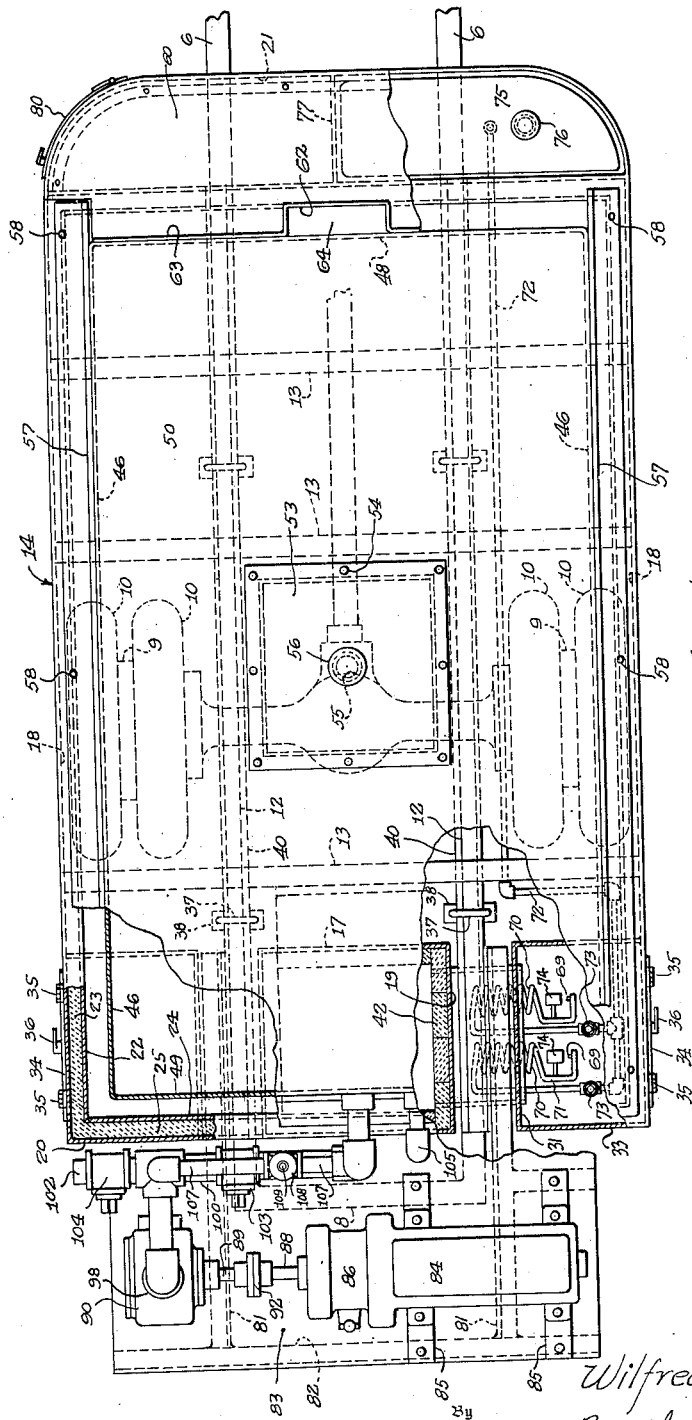

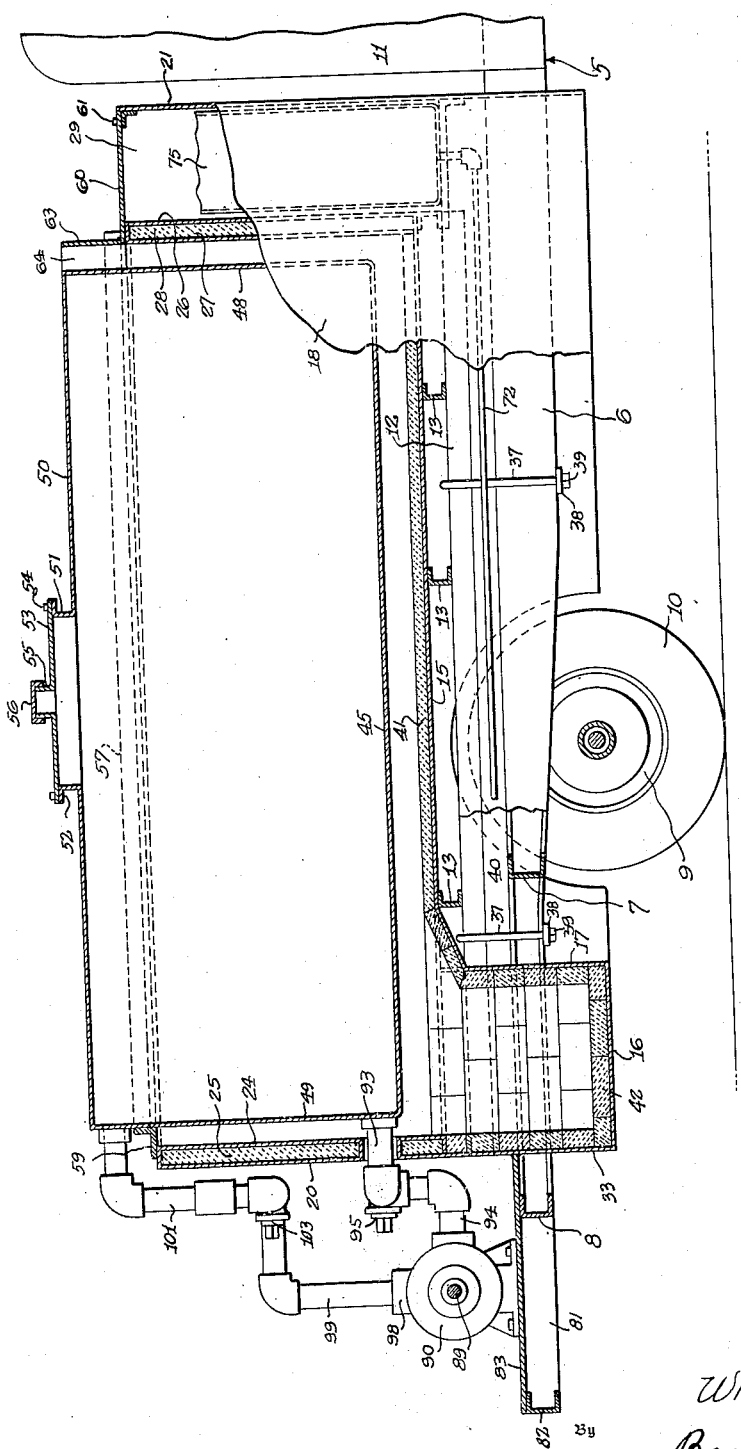

2,490,028

UNITED STATES PATENT OFFICE 2,490,028

HEATED TANK CONSTRUCTION FOR TANK VEHICLES

Wilfred G. Chausse, Detroit, Mich.

Application August 26, 1944, Serial No. 551,396

2 Claims. (Cl. 126—343.5)

The present invention relates to improvements in motor vehicle tank constructions and has particular reference to heated tank construction therefor.

The primary object of the invention is to provide a heated tank body construction for heating an ambulant supply of oil or other viscous material while said supply is in transit between its source and destination.

Another object of the invention is to provide a tank construction for motor behicles which may be easily applied to and removed from the vehicle chassis frame so that the motor vehicle chassis may be used for various other purposes during certain seasonal periods.

Another object of the invention is to provide a heated tank construction for motor vehicles wherein a heater at one end thereof is located in a dropped bottom portion of said tank construction and arranged so that the entire tank will be heated both economically and quickly.

Another object of the invention is to provide a motor vehicle tank construction in which the tank may be easily removed and replaced by another tank which is adapted to contain oil or viscous liquid of a slightly different nature so that during certain seasons the motor vehicle can be employed for transporting lubricating oil to aircraft and the like while by simply substituing another tank, the motor vehicle can be employed for spraying road surfacing material. In both instances, it is necessary to retain the contents of the tank in a high state of fluidity.

Another object of the invention is to provide a heated vehicle tank structure, with the heater therefor so positioned as to facilitate the heating of the entire tank area by passing the flames and combustion products of said heater over substantially the entire surface of the tank.

Another object of the invention is to provide a heated vehicle tank structure, with the heater therefor positioned rearwardly of the tank structure to facilitate the operation and control thereof and with said heater located at the centralmost point thereat to permit the flames to pass along the bottom and upward at each side of the vehicle tank.

Another object of the invention is to provide a heated vehicle tank structure of the above-mentioned type with a circulatory system for circulating the contents of the tank while the same is in transit to thereby insure the proper heating thereof and the maintenance of said contents in a proper state of fluidity.

Another object of the invention is to provide suitable pipe connection and valve structure for said circulatory system to permit the discharge of the liquid contents of the tank or to enable the circulatory system to circulate the liquid contents when the heater is in operation.

Another object of the invention is to provide a vehicle tank structure and circulatory system having a by-pass to render said system inoperative in the event that the valves are not in their proper operating position to either discharge said liquid contents or circulate said contents.

Other objects and advantages of the invention will become apparent during the course of the following description of the accompanying drawings, wherein:

Figure 1 is a top elevational view of the vehicle tank construction embodying the invention illustrating portions thereof broken away to show various details of construction;

Figure 2 is a longitudinal cross-sectional view of the vehicle tank construction illustrating in detail the position and location of the heater and showing a portion of the vehicle tank structure in side elevation;

Figure 3 is a rear elevational view of the vehicle tank construction showing the circulatory system therefor including the prime mover and pump of the circulatory system;

Figure 4 is a vertical cross-sectional view taken through the rear portion of the vehicle tank structure and illustrating in detail the manner in which the tank is removably held in position and the position and location of the burner for heating said tank.

In the drawings, the reference character 5 will generally be employed to designate a truck or vehicle including a chassis frame having longitudinal frame bars 6 connected by transverse frame bars 7 and 8. The chassis frame is supported by suitable wheels 9 having a dual tire construction for accommodating tires 10. The front portion of the chassis frame is supported by the usual steering wheels and a driver's cab 11 is also mounted on the front portion of said chassis frame to house the driver.

A tank housing is supported by the chassis frame and includes a frame structure having longitudinal channel bars 12 connected by transversely extending frame bars 13 welded or otherwise secured in place. The frame bars 13 extend beyond the sides of the chassis frame channel members 6 for supporting said tank housing generally indicated by the reference character 14.

The tank housing 14 includes a bottom wall 15 which is welded or otherwise secured to the frame bars 13 and the rear portion of the tank housing or casing 14 is provided with a dropped bottom wall portion 16 connected thereto by means of a vertical wall section 17. Side wall members 18 extend upwardly from the bottom wall 15 and similarly, side wall portions 19 extend upwardly from the dropped bottom wall 16 and are connected to the bottom wall 15. The vertical wall 17 connects the dropped wall 16 to the bottom wall 15, thereby forming a well or the like at the rear portion of the tank housing. A rear tank housing wall 20 connects the side walls 18 and a front housing wall 21 similarly connects the front portion of said side walls. The side walls 18 are provided with spaced interior walls 22 providing a space or chamber for receiving insulating material 23 and similarly, the rear front wall 20 is provided with a spaced inner wall 24 for accommodating insulating material 25. A front partition wall connects the side walls of the tank housing and includes spaced wall members 26 and 27 between which is interposed insulating material 28 similar to the insulating material 23 and 25. The partition walls form a chamber 29 forwardly of the tank housing for accommodating various implements and a reservoir tank for the heater which will be hereinafter more fully described.

It is to be noted that the side walls 18 extend downwardly from the bottom wall or floor 15 and conceal the chassis frame at each side thereof. At the rear portion of the tank housing the side walls are provided with inwardly extending bottom walls 30 which terminate in spaced relation from the side walls 19 of the dropped bottom 16 and said bottom walls 30 are provided with upwardly extending vertical walls 31 likewise spaced from the side walls 19 of the dropped bottom 16. The vertical walls 31 and depending portions of the side walls 18 are connected by front and rear walls 32a and 33 respectively to thereby form a housing or compartment 32 at each side of the dropped bottom portion 16 of the bottom wall 15. The right-hand compartment 32 serves as a burner compartment (Figure 4). Suitable openings may be provided in the lower portion of the side walls 18 to facilitate access to the compartment and said openings may be provided with closures 34 hinged as at 35 and provided with suitable latch members 36.

The longitudinal frame members 12 of the tank housing or casing 14 are secured to the longitudinal chassis frame members 6 by means of U-bolts 37 which are fitted with plates 38 adapted to extend beneath the channel chassis members 6. Nuts 39 are threaded on the legs of the U-bolts 37 to securely hold the housing in position. Interposed between the chassis channel members 6 and channel members 12 of the housing is a longitudinal bar 40 which may be formed of wood or any other suitable material to provide a seating surface between said channel bars 6 and 12.

The floor of the tank housing is provided with a refractory lining 41 and the well formed by the dropped bottom wall 16 is similarly lined with refractory bricks to form a heat chamber 42 for heating the contents of the vehicle tank.

The vehicle tank generally indicated by the reference character 44 comprises a bottom wall 45, side walls 46 and connecting end walls 48 and 49 at the front and rear thereof. A top wall 50 completes the tank structure and is provided with a dome 51 having an annular flange 52 to which is bolted a cover or the like as at 53 by means of bolts or screws 54. The cover plate 53 is provided with a vent opening 55 having a screw closure cap 56.

It is to be noted that the liquid tank 44 is spaced from the internal walls of the housing 14 and the sidewalls 46 of said tank are provided with angle bars 57 for being fastened to the upper end of the side walls 18 by means of screws or the like as at 58. The angle bars 57 are secured in place by means of welding or riveting. Similarly, an angle bar 59 is welded to the rear wall 49 of the tank structure and has one of its flanges overlying the upper edge of the rear wall 20 of said housing 14 so as to support the tank in the position shown in Figures 1, 2 and 4.

The chamber 29 forwardly of the tank 44 is closed by a cover plate 60 which is held in place by means of a screw or the like as at 61 and said cover plate is provided with a cutaway portion 62 extending inwardly from one edge thereof. An upstanding flange 63 is formed integral with the cover plate 60 and may be welded or otherwise secured to the front wall 48 of the tank 44. The upstanding flange 63 is bent around the opening 62 to form a smoke passageway 64 to facilitate the escape of the products of combustion from the fire chamber formed by the dropped bottom wall portion 16 of the housing 14.

Extending between the dropped bottom portion of the housing 14 and one of the vertical walls 31 is a tubular conduit 65 which has one of its ends received in an opening 66 in the side wall 19 of said dropped bottom portion so as to be in communication with the heat chamber 42 formed thereby while the other end is fitted in an opening 67 in the vertical wall 31 of the burner compartment 32 in such a manner as to facilitate its removal when so desired.

Mounted in the compartment with which said conduit 65 communicates, is a pair of burners 69 including jets which are connected to the generator coils 70 connected to suitable pipes 71 for supplying fuel thereto. The pipes 71 are connected to a supply pipe 72 by suitable fittings and control valves 73 are interposed therein to control the flow of fuel to the burners 69. Flame tubes 74 are mounted directly in front of the burners 69 so that the fuel will be mixed with air to support combustion thereof and permit the flame to be directed through the conduit 65 into the heat chamber formed by the dropped bottom portion of the housing 14. As shown in Figure 4, the super heating coils 70 extend into the conduit 65 so that the fuel will be preheated before passing to the burners 69 and assist in vaporizing the fuel as it passes through said jets.

The fuel supply pipe 72 extends forwardly and is connected to a fuel reservoir 75 mounted in the compartment 29 and said fuel reservoir is provided with a filler spout 76 and cover cap to facilitate replenishing the fuel supply. A partition wall 77 separates the fuel supply tank 75 from the remaining portion of the compartment 29 so that implements and containers may be stored therein and retained by means of a hinged cover 80.

Extending rearwardly from the chassis frame and secured to the side channel members 6 thereof is a pair of frame bars 81 which are welded or otherwise secured in place and said frame bars are connected at their free ends by means of a channel bar 82 (Figure 2). A platform 83 is supported and secured to the channel frame bars 81 and 82 for supporting the liquid circulating system which comprises an internal combustion engine 84 mounted on suitable supports or blocks 85 and fastened in place by screws or the like. The internal combustion engine 84 has its power shaft connected to a gear transmission 86 having a control lever 87 so as to control the speed of the output shaft 88. The output shaft 88 is aligned with the drive shaft 89 of a liquid pump 90 which has its base affixed to the platform 83 by means of screws or the like as at 91. A flexible coupling 92 is provided for drivingly connecting the output shaft 88 with the drive shaft 89 of the pump 90 so as to cause rotation of the impeller thereof when it is desired to circulate the contents of the liquid tank 44. The rear wall 49 of the tank 44 is provided with a pipe fitting 93 which is connected to the intake pipe fitting 94 of the pump 90 by suitable elbow fittings or the like. Interposed between the intake pipe 94 and the pipe 93 is a control valve 95 and said pipe 93 is provided with an extension 96 and manual control valve 97 for a purpose which will be hereinafter more fully described. The exhaust 98 of the pump is provided with a discharge pipe 99 which is connected to the top of the tank by means of a manifold pipe 100 which has one of its ends directly connected with the tank 44 by means of a pipe 101 while the other end is projected beyond the pipe 99 as at 102. A control valve 103 is interposed in the pipe 100 and similarly, a manual control valve 104 is interposed between the projection 102 and manifold pipe 100 similar to the valve 97.

An overflow pipe 114 is connected to the top of the tank by means of an elbow fitting 105 which projects to the rear wall 49 and said overflow pipe has its free end extending downwardly below the level of the platform 83 as at 106.

In order to prevent damage to the liquid circulating system, a by-pass pipe 107 is connected to the vertical discharge pipe 99 extending upwardly from the pump 90 and the manifold pipe 100 and said by-pass is provided with a relief valve 108 having a spring-pressed valve plug adjustably tensioned by means of a screw 109 to insure the opening of the relief valve and unseating of the valve plug thereof when a predetermined fluid pressure is reached.

In operation, the tank 44 may be filled with liquid such as oil for either lubricating or roadsurfacing purposes and when the tank is filled by gravity the cover 56 is simply removed and the tank is filled through the spout 55. After the tank is filled, the burners 69 are ignited to generate heat in the dropped bottom portion of the bottom wall 15 so that the heat and products of combustion will pass forwardly between the bottom wall 15 of the housing 14 and the bottom wall 45 of the tank 44. Obviously, heat may also pass upwardly between the side, front and back walls of the housing and tank respectively so that the products of combustion may pass out of the smoke stack or passage 64. In the case of transporting lubricating oil from the main reservoir to aircraft and the like, where it is desired to have lubricating oil at a certain temperature to facilitate efficient operation of the aircraft, the burners are ignited so that the oil will be heated during transit from said main reservoir to the aircraft and simultaneously may be circulated by means of a pump 90 and the proper control of various valves. During the circulation of the oil and other liquid, the manual control valves 97 and 104 are closed and the valves 95 and 103 opened to permit circulation of the liquid contents of the tank through the pipe 93, pump 90 and returned to the top of the tank 44 through the manifold pipe 100.

If it is desired to discharge the contents of the tank, the valve 97 is closed as well as the valve 103 so that the liquid contents of the tank will flow through the pipe 93 to the pump 90 and thence through the discharge pipes 99 and 102 through the valve 104 which is open in a similar manner to the valve 95.

When it is desired to fill the tank 44 from a liquid reservoir located or positioned so as to prohibit the filling of the tank by gravity, the valve 95 is closed as well as the valve 104 with the valves 97 and 103 positioned so as to permit the passage of liquid therethrough and so as to communicate the pipe extension 96 with the pump 90 and thence to the tank 44 through the discharge pipe 99, manifold pipe 100 and vertical pipe 101.

If it is desired to use the motor vehicle tank for spraying oil or other road surfacing material, a suitable spray nozzle may be supported on the underside of the platform 83 with the jets thereof projected downwardly and the intake connected by suitable piping to the pipe extension 102 of the manifold pipe 100. By then closing the valves 97 and 103, the liquid contents of the tank 44 will then pass through the discharge pipe 103, control valve 95, liquid pump 90 and thence through the vertical discharge pipe 99 to the extension 102 where it will be supplied to the nozzle positioned under said platform.

It is to be understood that the form of the invention herewith shown and described is to be taken as a preferred embodiment of the invention and that various changes may be made in the shape, size and arrangement of parts without departing from the spirit of the invention or the scope of the subjoined claims.

What I claim is:

1. A heated tank construction for tank vehicles comprising a horizontally elongated housing enclosing a heat chamber, a horizontally elongated liquid tank mounted in said housing in spaced relationship with the side walls thereof and extending into said heat chamber, a burner compartment disposed below and near one end of said housing to one side of said heat chamber and communicating with said heat chamber, said burner compartment extending transversely of said housing and having an access opening disposed on one side of said housing, and a liquid fuel burner mounted in said burner compartment transversely of said housing and externally of said heat chamber and directed toward said heat chamber.

2. A heated tank construction for tank vehicles having longitudinal chassis frame members, said construction comprising a horizontally elongated housing mounted on said frame members and enclosing a heat chamber, a horizontally elongated liquid tank mounted in said housing in spaced relationship with the side walls thereof and extending into said heat chamber, a burner compartment disposed below and near one end of said housing to one side of said heat chamber and having a passageway extending under one of said frame members into said heat chamber, said burner compartment and said passageway extending transversely of said housing and having an access opening disposed on one side of said housing, and a liquid fuel burner mounted in said burner compartment transversely of said housing and externally of said heat chamber and directed through said passageway toward said heat chamber.

WILFRED G. CHAUSSE.

REFERENCES CITED

The following references are of record in the file of this patent:

UNITED STATES PATENTS

| Number | Name | Date |
|---|---|---|
| 440,209 | Washburn | Nov. 11, 1890 |
| 500,612 | Read et al. | July 4, 1893 |
| 546,444 | Butcher | Sept. 17, 1895 |
| 559,217 | Ripley | Apr. 28, 1896 |
| 934,426 | Carter | Sept. 21, 1909 |
| 960,165 | Graver | May 31, 1910 |
| 994,579 | Eberstaller | June 6, 1911 |
| 1,001,014 | French | Aug. 22, 1911 |
| 1,021,781 | Kingsley | Apr. 2, 1912 |
| 1,061,916 | Johnston | May 13, 1913 |
| 1,190,019 | Reale | July 4, 1916 |
| 1,197,745 | Kinney | Sept. 12, 1916 |
| 1,514,252 | Fellman | Nov. 4, 1924 |
| 1,541,849 | Reynolds | June 16, 1925 |
| 1,751,452 | Streitmann | Mar. 18, 1930 |
| 1,755,376 | Thompson | Apr. 22, 1930 |
| 1,855,961 | Hargrave | Apr. 26, 1932 |
| 1,937,226 | Horch | Nov. 28, 1933 |
| 1,949,471 | Hildbrand, et al. | Mar. 6, 1934 |
| 2,030,555 | Van Vorst et al. | Feb. 11, 1936 |
| 2,046,098 | Vance, et al. | June 30, 1936 |
| 2,076,780 | Haupt | Apr. 13, 1937 |
| 2,100,687 | Cornelius | Nov. 30, 1937 |
| 2,275,705 | Wagner | Mar. 10, 1942 |
| 2,317,441 | Chausse | Apr. 27, 1943 |

FOREIGN PATENTS

| Number | Country | Date |
|---|---|---|
| 249,304 | Great Britain | Mar. 25, 1926 |
| 700,805 | France | Jan. 2, 1931 |
| 750,686 | France | May 29, 1933 |